United States Patent
McClintock et al.

(10) Patent No.: US 9,937,868 B2
(45) Date of Patent: Apr. 10, 2018

(54) ACCENT LIGHTING OF AUTOMOTIVE ROOF RAILS

(71) Applicants: MAGNA INTERNATIONAL INC., Aurora (CA); Steven D. McClintock, South Lyon, MI (US); Robert M. Horner, Plymouth, MI (US); Brian A. Krull, Sterling Heights, MI (US); Mark T. Pilette, Oxford, MI (US)

(72) Inventors: Steven D. McClintock, South Lyon, MI (US); Robert M. Horner, Plymouth, MI (US); Brian A. Krull, Sterling Heights, MI (US); Mark T. Pilette, Oxford, MI (US)

(73) Assignee: Magna International Inc., Aurora (CA)

( * ) Notice: Subject to any disclaimer, the term of this patent is extended or adjusted under 35 U.S.C. 154(b) by 81 days.

(21) Appl. No.: 14/891,136

(22) PCT Filed: May 16, 2014

(86) PCT No.: PCT/US2014/038326
§ 371 (c)(1),
(2) Date: Nov. 13, 2015

(87) PCT Pub. No.: WO2014/186659
PCT Pub. Date: Nov. 20, 2014

(65) Prior Publication Data
US 2016/0121799 A1    May 5, 2016

Related U.S. Application Data

(60) Provisional application No. 61/824,080, filed on May 16, 2013.

(51) Int. Cl.
*B60R 9/04* (2006.01)
*B60R 13/04* (2006.01)
(Continued)

(52) U.S. Cl.
CPC .............. *B60R 9/04* (2013.01); *B60Q 1/24* (2013.01); *B60Q 1/2661* (2013.01); *B60Q 1/323* (2013.01)

(58) Field of Classification Search
CPC ........... B60R 9/04; B60Q 1/24; B60Q 1/2611; B60Q 1/2661; B60Q 1/323
See application file for complete search history.

(56) References Cited

U.S. PATENT DOCUMENTS 4,426,028 A    1/1984  Bott
6,114,954 A    9/2000  Palett et al.
(Continued)

FOREIGN PATENT DOCUMENTS

CN    202669656 U    1/2013
EP    2 062 784 A2    5/2009

OTHER PUBLICATIONS

International Search Report for International Application No. PCT/US2014/038326, dated Sep. 24, 2014.

*Primary Examiner* — Alan Cariaso
(74) *Attorney, Agent, or Firm* — Warn Partners, P.C.

(57) ABSTRACT

A roof rail assembly (10) including at least one stanchion portion (12) having a cover (14) and at least one lighting device (16). A light permeable film (22) provides a predetermined surface appearance and/or design and is translucent to allow light from the lighting device (16) to pass through under predetermined conditions. When the lighting device (16) is not illuminating, the light permeable film (22) provides a predetermined surface appearance. The film (22) is operatively translucent when the lighting source (16) is illuminated and additionally provides a predetermined design appearance when backlit. The selective lighting on the stanchions of the roof rails (18) provides illumination (Continued)

and a higher location of the indicator of unlock for easier location of a vehicle at greater distances.

20 Claims, 5 Drawing Sheets

(51) Int. Cl.
    *B60Q 1/26*         (2006.01)
    *B60Q 1/32*         (2006.01)
    *B60Q 1/24*         (2006.01)

(56) References Cited

U.S. PATENT DOCUMENTS 7,377,674 B2 *   5/2008   Klinkman ................ B60Q 1/24
                                                             362/480
2012/0031939 A1    2/2012   Jutila et al.

* cited by examiner

FIG. 5A
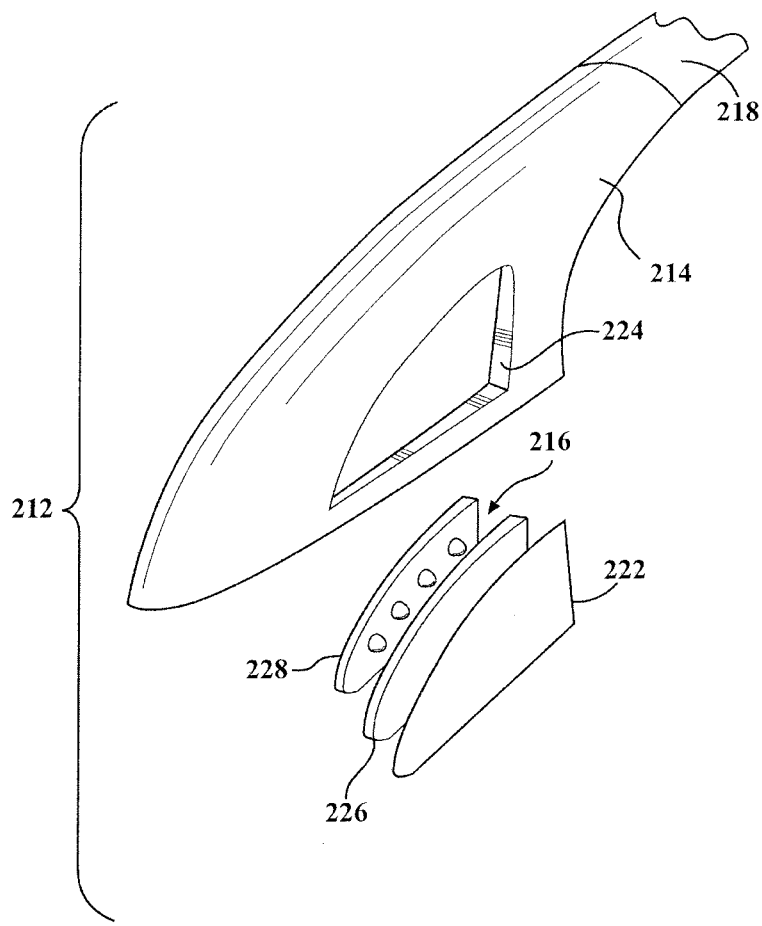
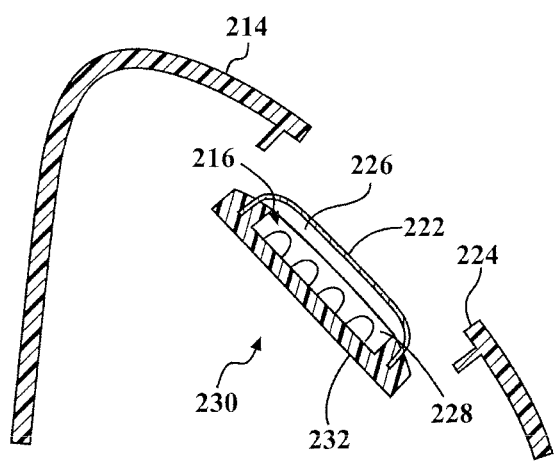
FIG. 5B

ACCENT LIGHTING OF AUTOMOTIVE ROOF RAILS

CROSS-REFERENCE TO RELATED APPLICATIONS

This application is a National Stage of International Application No. PCT/US2014/038326, filed May 16, 2014. This application claims benefit of U.S. Provisional Patent Application No. 61/824,080 filed May 16, 2013. The disclosures of the above applications are incorporated herein by reference.

FIELD OF THE INVENTION

The present invention relates to cargo management system illumination.

BACKGROUND OF THE INVENTION

Roof rack assemblies are a common way luggage is stowed on a vehicle during travel. It has become common place to use the roof of a vehicle to stow items which do not fit inside the vehicle. There are many different types of roof racks available which are used on many different types of vehicles, such as mini-vans, sport utility vehicle, cars, and the like. Typical roof racks are molded to form mounted feet to attach to the roof and a cross-bar therebetween for stowage. These roof racks typically extend across the roof of the vehicle in a manner perpendicular to the direction of vehicle travel and/or parallel to the direction of vehicle travel.

The increased uses of head lamp units and tail lamp units of vehicles have enhanced vehicle location assistance. Head lamp and tail lamp units are lamp assemblies that are generally positioned on the front and rear, e.g., front left and right and rear left and right, of the vehicle at heights below the vehicle roof. Typical head lamp and tail lamp units provide illumination during breaking and under low light conditions and are also capable of flashing light upon the unlocking of the vehicle. This allows for an individual trying to locate the vehicle to unlock the vehicle from a distance using a key fob device causing the head and tail lamp units to flash upon vehicle unlock. Generally, the lamps then stay lit when the vehicle is unlocked. Typical lamps in many situations are not visible from a distance due to the height and/or obstruction of other vehicles, and also do not provide, or retract from, a desired stylized appearance of the vehicle.

Accordingly, there is a desire to provide a roof rail assembly which provides cargo management and a visible light that is illuminated upon unlock of a vehicle under predetermined conditions from a greater distance and height, while providing desired appearance and backlit features.

SUMMARY OF THE INVENTION

The present invention is directed to a roof rail assembly providing accent lighting of automotive roof rack stanchions. There is provided at least one stanchion portion of the roof rail assembly, most preferably at least two stanchion portions, for selective illumination under predetermined conditions. The stanchion portion has a cover containing at least one lighting device. A film is applied to provide a predetermined surface appearance and/or design when backlit and is translucent to allow light from the lighting device to pass through under predetermined conditions. The selective lighting on the stanchion portions of the roof rails provides a higher location of the illumination as an indicator of vehicle unlock, viewable from all sides of the vehicle for easier location and identification of a vehicle from greater distances in such cases as crowded parking lots and/or in the case of forgetting where one parked. When the lighting device is turned off, or otherwise ceases illumination under predetermined conditions, the film provides a predetermined appearance on the stanchion portion such as a chrome appearance. When the lighting device is actuated or engergized under predetermined conditions, light is allowed to pass through the translucent film, which film may additionally have a desired design on the back side of the film to achieve a desired appearance when backlit by the lighting device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5A is an exploded view illustrating the stanchion portion of FIG. 5, in accordance with the third embodiment of the present invention;

FIG. 5B is a sectional view of the stanchion portion including a lighting module unit, in accordance with a third embodiment of the present invention.

DETAILED DESCRIPTION OF THE PREFERRED EMBODIMENTS

The following description of the preferred embodiment(s) is merely exemplary in nature and is in no way intended to limit the invention, its application, or uses.

Referring to the figures generally, in accordance with the present invention, a roof rail assembly is provided with at least one stanchion portion, most preferably at least two stanchion portions, comprising at least one lighting module assembly with at least one lighting device such as light emitting diodes as a light source packaged within the roof rail stanchion portion for the purpose of vehicle identification/locating by illumnation. A film covers the entire stanchion portion. Alternatively, the film is captured in a plastic molded cover and the lighting module assembly with a lens and at least one lighting device is rear mounted behind the film area. Alternatively, the film is part of the lighting module assembly, where the module further includes a lens and at least one lighting device, and the lighting module assembly is rear mounted into an opening in a plastic molded cover. There is provided a lighting module assembly, which includes a formed film material having an outward appearance such as being chrome in appearance but is translucent, and, most preferably, additionally with a printed design on the back side of the film to achieve a desired appearance when backlit, or the module is formed from a two shot molding process which would yield the same affect of a printed stencil. The formed film is back injected with a light transmissive plastic material, such as a translucent natural acrylonitrile butadiene styrene (ABS) or a transparent polycarbonate (PC) or poly(methyl methacrylate) (PMMA) to complete the lens. Attached to the back side of the lens is the lighting module or device, whether provided with surface mounted LEDs attached to a printed PC board or another lighting source. The other lighting source, by way of example, utilizes sheet form fiber optics or a molded acrylic light piping part. Preferably, a translucent chrome appearance film with printing on the back side of the film to achieve a desired design element is used and/or a two shot molding process is used to achieve the desired design feature in combination with light transmitting properties.

There are significant benefits and advantages provided by the present invention, including, but not limited to, providing visible lighting structures that are illuminated under predetermined conditions, e.g., upon the unlock of the vehicle and/or as a design feature during vehicle operation, from a greater distance and height than conventional vehicle head/tail lamps which may not be visible due to vehicle location and/or obstructions and lack desired appearance or backlit elements. The lighting on the roof rails also provides a higher location of the indicator of unlock, e.g., by a key fob, for easier location and identification of a vehicle in crowded parking lots and the like.

Figure 1:
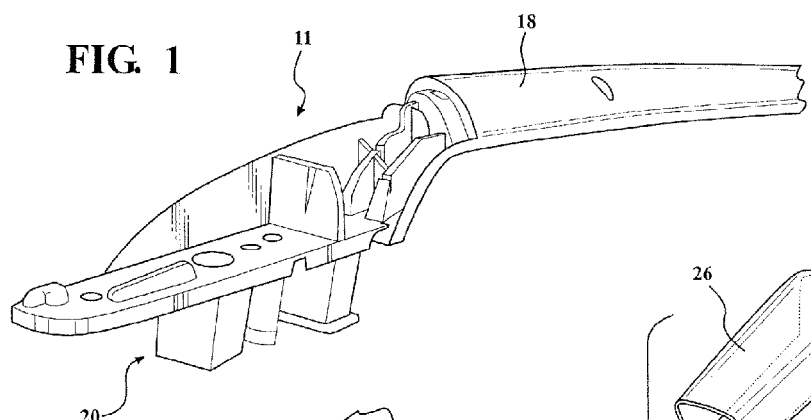
FIG. 1 is a perspective view of a roof rail assembly mounting portion and stanchion portion, in accordance with the present invention.
Figure 2:
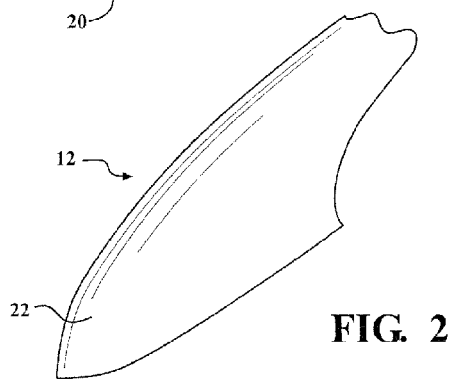
FIG. 2 is a perspective view of the stanchion portion with a film cover covering the entire stanchion portion, in accordance with the present invention.
Figure 3A:
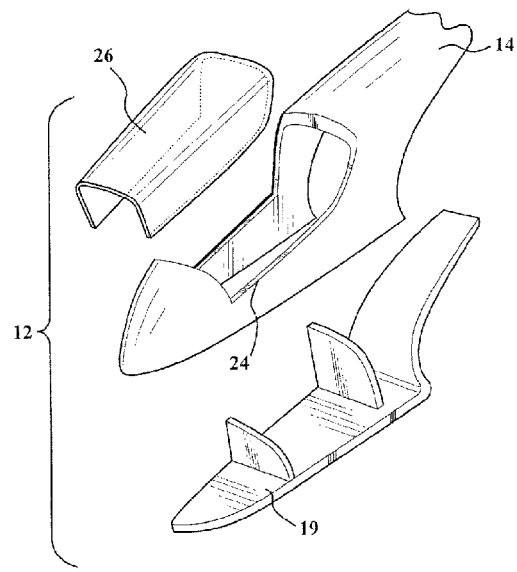
FIG. 3A is an exploded view of the stanchion portion of FIG. 2 with a film/cover portion removed, in accordance with the present invention.
Figure 3B:
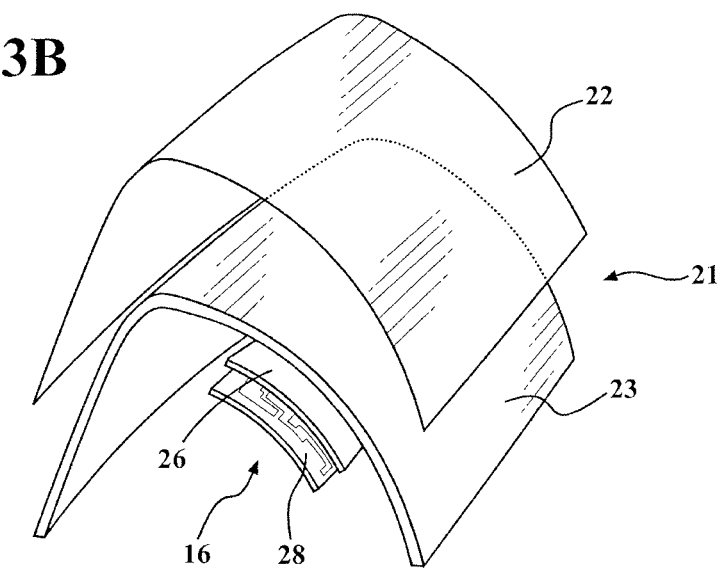
FIG. 3B is an exploded view illustrating a portion of the stanchion portion of FIGS. 2-3A, in accordance with the present invention.
Figure 6:
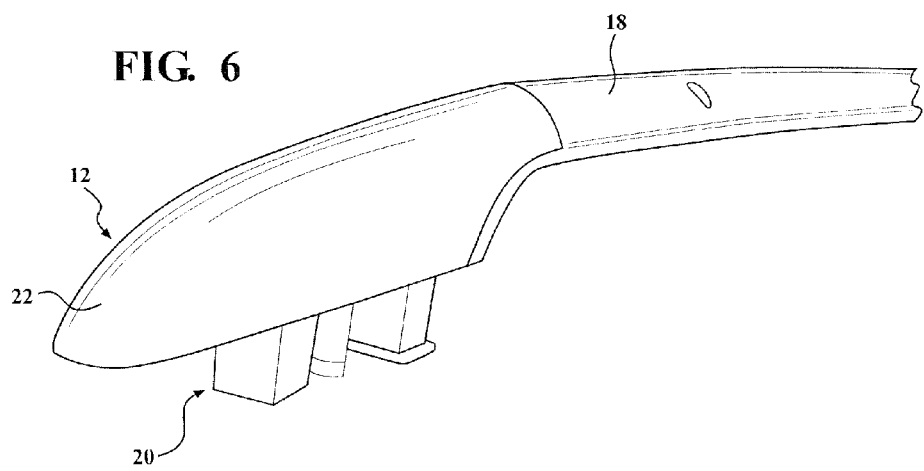
FIG. 6 is a perspective view of roof rail assembly, in accordance with the present invention.

Referring to the figures generally, and more particularly generally to FIGS. 1 and 6, there is provided a roof rail assembly, shown generally at 10, including a plurality of mounting portions, shown generally at 11, and a plurality of stanchion portions, shown generally at 12, in accordance with the present invention. Each stanchion portion 12 includes a cover and at least one lighting device, as explained in greater detail below. The at least one lighting device includes, but is not limited to, light emitting diodes, surface mounted light emitting diodes to a printed circuit board, fiber optics, sheet form fiber optics, a molded acrylic light piping part, and combinations thereof.

A plurality of roof rails, shown generally at 18, are connected toward respective ends to the plurality of mounts 10 and/or the plurality of stanchion portions 12. A plurality of attachment features, shown generally at 20, connect the roof rail assembly 10 to a vehicle roof. The roof rail assemblies 10 are orientated to the vehicle such that the plurality of roof rails 18 are arranged on the vehicle roof in a cross-car and/or or fore/aft position for the plurality of roof rails 18 to provide for stowing of cargo thereon. By way of non-limiting example, a hollow portion can be provided at both ends of the roof rail 18 and the stanchion portion 12 partly inserted into the hollow portion at each end of said at least one roof rail 18 for attaching to the roof rail 18, e.g., snap fit engagement, fastener(s), and combinations thereof.

The stanchion portion 12 includes a film operable to provide a predetermined surface appearance and/or design and to be translucent to allow light from the at least one lighting source 16 to pass through under predetermined conditions. The film is translucent and provides a predetermined surface appearance, e.g., a desired decorative appearance, chrome, metallic, color(s) and/or lack thereof, color match with vehicle, brushed metal, image(s), printed design, printed stencil, chrome in appearance but is translucent, and combinations thereof. Preferably, a film material is used having a translucent chrome appearance, but is translucent, with printing on the back side of the film to achieve a desired design element when backlit by the at least one lighting device, and/or a two shot molding process which yields the same desired design affect, e.g., of a printed stencil, and is light transmissive.

Referring to the figures generally, and more particularly generally to FIGS. 2-3B and 6, the roof rail assembly 10 in accordance with the present invention has a film, where the film covers the entire stanchion portion 12. The film 22 has a predetermined surface appearance, e.g., a bright film cover, translucent chrome film with a printing design element on the back side of the film. There is provided a cover 14 and at least one lighting device, shown generally at 16. The cover 14 is formed of a molded plastic, more preferably formed of a material to provide a substrate that is substantially translucent. At least one opening 24 is provided in the cover 14 and a respective lens 26 covers the opening 24. The lens 26 is generally U-shaped and is top mounted over the opening 24 such that illumination is provided through a top and side portions of the stanchion portion 12. The at least one lighting device 16 is attached to the back of the lens 26, e.g., surface mounted LEDs on a printed circuit board 28 attached to the backside of the lens 26, for forming a lighting module assembly. The lens helps to further direct the at least one lighting source 16 is directed through the film 22. The stanchion portion 12 is operably connected to the mounting portions 11 and/or a base 19 of the stanchion portion 12 is operably mounted directly to the vehicle roof and/or to the mounting portion 11 connected to the vehicle roof and/or the base 19 is integrally formed therewith.

The film 22 covers the whole stanchion portion 12 and is applied by a method suitable to hold the film 22 in place. Preferably, the film 22 covers the entire outer surface of the cover 14 and lens 26. Most preferably, the film 22 is wrapped over any outward surfaces of the stanchion portion 12, e.g., cover 14, lens 26, and base 19, viewable when the roof rail assembly 10 is attached to the vehicle.

The film can also be a formed film, shown generally at 21, that comprises film 22 back injected with a clear substrate plastic material 23 of a predetermined thickness that is translucent to complete the lens. Generally, comprising translucent ABS, transparent polycarbonate (PC), transparent PMMA, nylon, lexan, Lucite, polyethylene, polypropylene, acrylic or copolymers thereof, and combinations thereof. Preferably, a light transmissive plastic material 23 is used such as translucent ABS, transparent polycarbonate (PC), or transparent PMMA.

The lighting device 16 uses light emitting diodes as a light source packaged within the roof rail stanchion portion 12 to provide vehicle identification via illumination. The lighting on the roof rail assembly 10 provides a higher location of the indicator of unlock, e.g., when vehicle is unlocked using a key fob, for easier location of a vehicle in crowded parking lots, or in the case of forgetting where one parked, from all sides of the vehicle at greater distances. When the lighting source is turned off, or otherwise deenergized to cease illumination, the film 22 provides a predetermined surface appearance. When the lighting source is actuated under predetermined conditions light is allowed to pass through.

Figure 4:
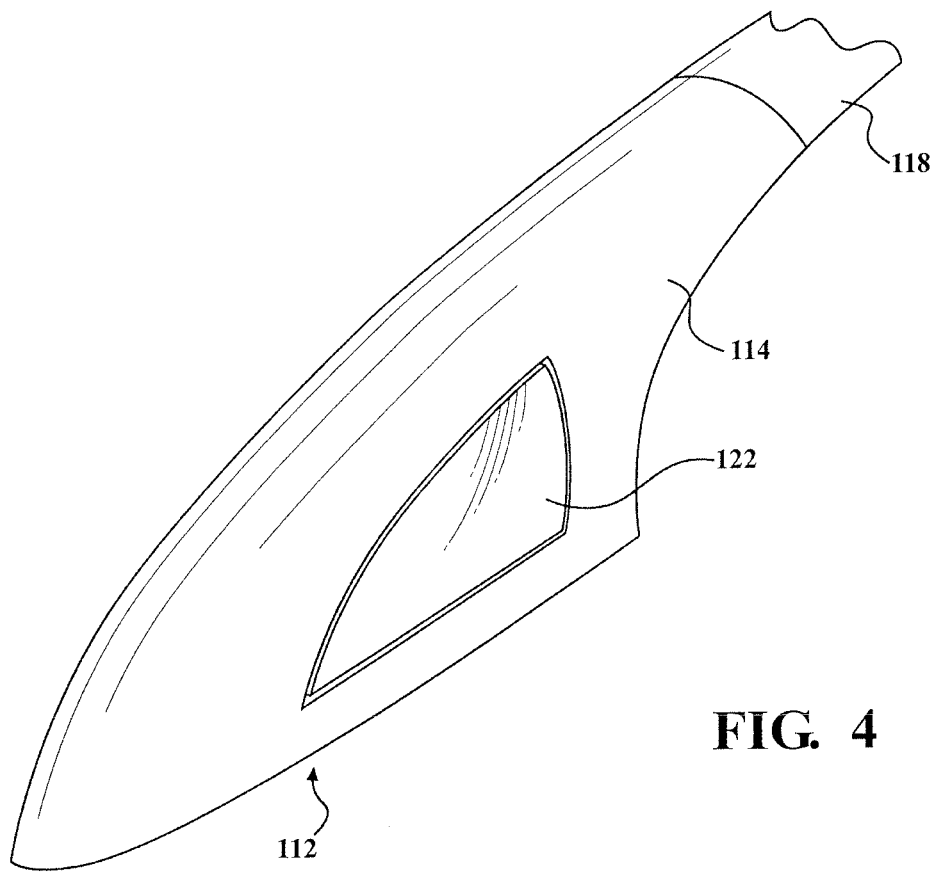
FIG. 4 is a perspective view of a stanchion portion of a roof rail assembly with a film captured in a plastic molded cover, in accordance with a second embodiment of the present invention.
Figure 4A:
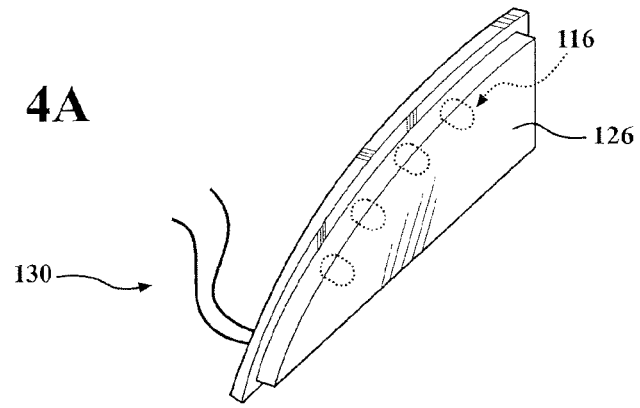
FIG. 4A is a perspective view of a lighting device of the stanchion portion, in accordance with the second embodiment of the present invention.
Figure 4B:
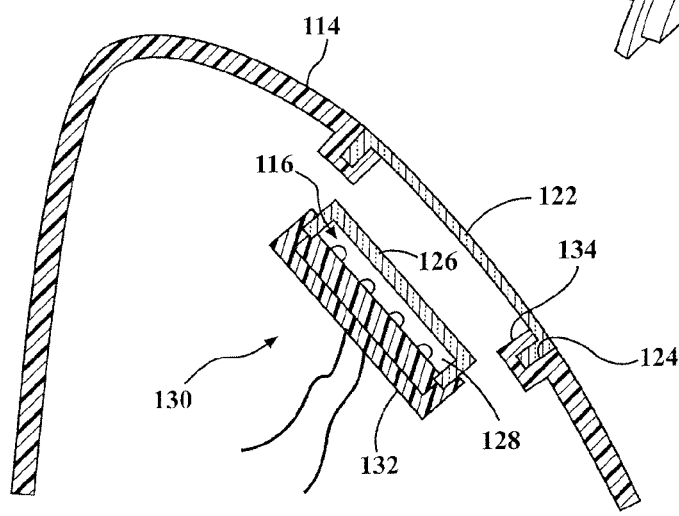
FIG. 4B is a sectional view of the stanchion portion with a film captured in a cover, in accordance with the second embodiment of the present invention.

Referring to the figures generally, and more particularly generally to FIGS. 4-4B, in accordance with another embodiment of the present invention there is provided a stanchion portion, shown generally at 112, where the film 122 is captured in the plastic molded cover 114. The stanchion portion 112 is coupled to the roof rail 118, as described previously. There is provided at least one lighting module assembly, shown generally at 130, including at least one lens 126, printed circuit board 128, and at least one light device 116, forming a lighting module unit that is housed within the cover 114 of the stanchion portion 112 covering an opening 124 formed in the cover 114. The film 122 is captured in the cover 114 in a path of illumination of the lighting module assembly 130. The film 122 can be captured in the cover 114 by suitable methods including mechanical interlocking with the cover 114, mechanical clamping, adhesive, cling, placed within a mold and the cover 114 is molded around, coupled to the lens 126, and combinations thereof.

The lighting module assembly 130 is configured to be positioned behind the film 122, most preferably, suitably sized to be placed in direct abutting engagement such that the lens 126 is against the backside of the film 122, and is rear mounted to the cover 114. The lighting module assembly 130 includes a bracket 132 portion which is rear mountable to the cover 114, e.g., using friction, fasteners, adhesive, and combinations thereof, or any other fasteners suitable for positionally securing the module 130 to the cover 114, e.g., to mount the lighting module assembly 130 relative to an inner opening 134 formed in the cover 114. FIG. 4B illustrates the lighting module assembly 130 to be rear mounted such that at least the lens 126 will be located within the inner opening 134 formed in the cover 114 directly adjacent the film 122.

Figure 5:
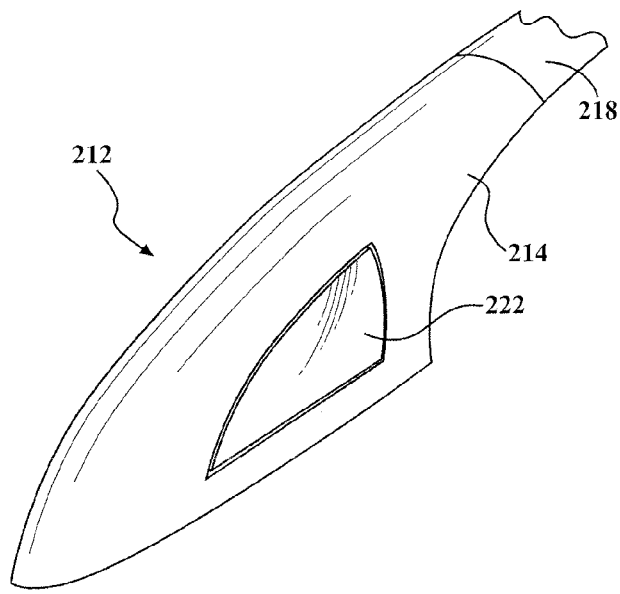
FIG. 5 is a perspective view of a stanchion portion of a roof rail assembly with a film part of a module assembly mounted from the rear into an opening in a cover, in accordance with a third embodiment of the present invention.

Referring to the figures generally, and more particularly generally to FIGS. 5-5B, in accordance with another embodiment of the present invention there is provided a stanchion portion, shown generally at 212, where the film 222 is part of a lighting module assembly, shown generally at 230. The stanchion portion 212 is coupled to the roof rail 218, as described previously. There is provided at least one lighting module assembly 230, where the lighting module assembly 230 includes the film 222, lens 226, printed circuit board 228 and at least one lighting device 216. The lighting module unit 230 is mounted from the rear into an opening 224 formed in the cover 214.

The lighting module assembly 230 is positionally secured in the opening 224. The lighting module assembly 230 includes a bracket 232 portion which is rear mountable to the cover 214, e.g., using friction, fasteners, adhesive, and combinations thereof, or any other fasteners suitable to rear mount the lighting module assembly 230 into the opening 224 formed in the cover 214. FIG. 5B illustrates the lighting module assembly 230 to be mounted from the rear into the opening 224 formed in the cover 214 such that the film 222 over the lens 226 is viewable.

In accordance with another embodiment of the present invention a roof rail assembly 10 installation is provided and includes an inventive film covering over the entire stanchion portion or illumination opening and/or lens portion which provides a decorative match with the vehicle design of roof rack of the vehicle. The stanchion lighting can be disguised or hidden and imperceptible in the vehicle design when not illuminated. The accent lighting of the roof rail appearance is masked with the light permeable film which is opaque in ordinary light conditions without the at least one lighting source being illuminated but is operatively translucent when the lighting source is illuminated. In a preferred embodiment the film provides a chrome like coating on the stanchion portion. However, other finishes may be used to provide a color match or chrome or other aesthetically pleasing outside appearance when the light is not actuated. The characteristics of the film and/or the lighting source, e.g., LED's or other lighting, used for the actual light are adjusted based on lighting requirements in a particular application. In an embodiment the film is molded in place during production of the roof rail assembly 10. Films can be translucent polycarbonate, PMMA, ABS, lexan, Lucite, nylon, polyethylene, polypropylene, acrylic or copolymers thereof.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A roof rail assembly for a vehicle, comprising:
   a plurality of mounting portions attached to a vehicle arranged to allow stowing of cargo;
   at least one roof rail coupled to said plurality of mounting portions;
   a stanchion portion coupled to each end of said at least one roof rail and having a cover;
   at least one lighting device;
   a lens to direct illumination of said at least one lighting device;
   an opening formed in the cover to receive said lens; and
   a film which provides a predetermined surface appearance on said stanchion portion when the at least one lighting device is not actuated and which allows light to pass through the film under predetermined conditions upon illumination of said at least one lighting device.

2. The roof rail assembly of claim 1, wherein said film covers the entire stanchion portion.

3. The roof rail assembly of claim 1, wherein said film is captured in said cover and located over an area of said lens.

4. The roof rail assembly of claim 1, wherein said film is part of a lighting module assembly, said lighting module assembly rear mounted into said opening in said cover.

5. The roof rail assembly of claim 1, wherein said film is formed of a material with a chrome appearance and is translucent for light transmission upon illumination of said at least one lighting device.

6. The roof rail assembly of claim 5, wherein said film has a predetermined printed design on the back side of said film suitable to provide a desired surface appearance when backlit by said at least one lighting device.

7. The roof rail assembly of claim 5, wherein said film has a predetermined design provided by a two shot molding process to achieve said predetermined surface appearance when backlit by said at least one lighting device.

8. The roof rail assembly of claim 1, wherein said film is back injected with a light transmissive plastic material.

9. The roof rail assembly of claim 1, wherein said film is back injected with a light transmissive plastic material, said light transmissive plastic material selected from the group consisting of acrylonitrile butadiene styrene (ABS) or a transparent polycarbonate (PC) and poly(methyl methacrylate) (PMMA), to complete the lens.

10. The roof rail assembly of claim 1, wherein said cover is a plastic molded cover with said opening to receive said lens.

11. The roof rail assembly of claim 1, wherein said stanchion portion further comprises a printed circuit (PC) board, where said PC, lens, and said at least one lighting source form a lighting module assembly housed within said cover.

12. The roof rail assembly of claim 11, wherein said lighting module assembly is mounted within an inner opening of said cover adjacent to said film.

13. The roof rail assembly of claim 11, wherein said film is part of said lighting module assembly, said lighting module assembly is rear mounted into said opening of said cover.

14. The roof rail assembly of claim 1, wherein said at least one lighting device is connected to the back side of said lens.

15. The roof rail assembly of claim 1, wherein said at least one lighting device is selected from the group consisting of light emitting diodes, surface mounted light emitting diodes to a printed circuit board, fiber optics, sheet form fiber optics, molded acrylic light piping part, and combinations thereof.

16. A roof rail assembly for a vehicle roof, comprising:
a plurality of mounting portions attached to a vehicle arranged to allow stowing of cargo;
at least one roof rail coupled to said plurality of mounting portions;
a stanchion portion coupled to each end of said at least one roof rail and having a cover, at least one lighting module assembly including at least one lighting device, a lens to direct illumination of said at least one lighting device; and a film;
wherein the film provides a predetermined surface appearance on said stanchion portion when the at least one lighting device is not actuated and which allows light to pass through the film under predetermined conditions upon illumination of said at least one lighting device.

17. The roof rail assembly for a vehicle roof of claim 16, wherein said film covers the entire stanchion portion.

18. The roof rail assembly of claim 16, wherein an edge of said film is captured in said cover during molding and said lighting module assembly is rear mounted within an inner opening of said cover such that said lens is in abutting engagement with the back side of said film.

19. The roof rail assembly of claim 16, wherein said film is part of said lighting module assembly and said lighting module assembly is rear mounted into an opening formed in said cover.

20. A roof rail assembly for a vehicle roof, comprising:
a plurality of mounting portions attached to a vehicle arranged to allow stowing of cargo;
at least one roof rail coupled to said plurality of mounting portions;
a stanchion portion coupled to each end of said at least one roof rail and having a cover and at least one lighting module assembly including at least one lighting device;
a lens to direct illumination of said at least one lighting device; and
a film back injected with a light transmissive plastic material, where the stanchion portion provides a predetermined surface appearance when the at least one lighting device is not actuated and which allows light to pass through the film under predetermined conditions upon illumination of said at least one lighting device.

* * * * *